Oct. 9, 1951      B. COMBEE      2,570,770
X-RAY TUBE HAVING A ROTARY ANODE
Filed Dec. 22, 1948
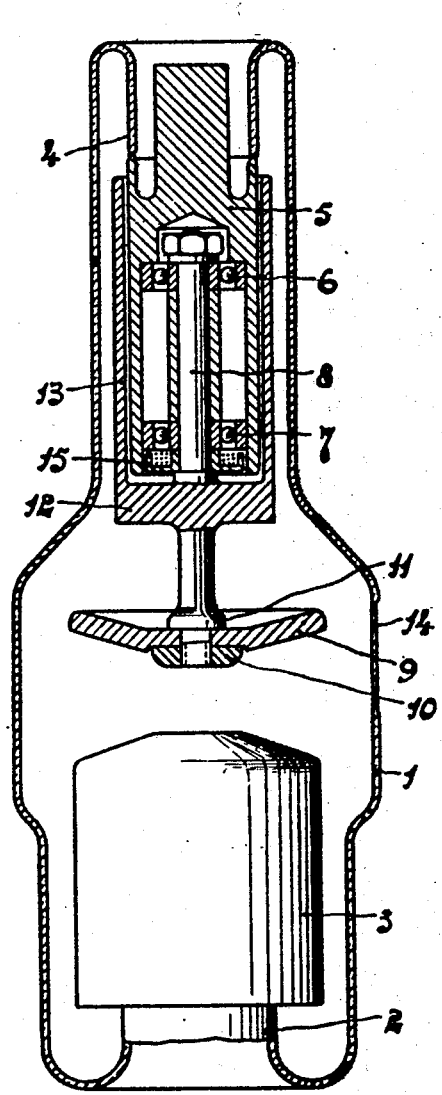
BART COMBEE
INVENTOR.
BY *[signature]*
AGENT

UNITED STATES PATENT OFFICE 2,570,770

X-RAY TUBE HAVING A ROTARY ANODE

Bart Combée, Eindhoven, Netherlands, assignor to Hartford National Bank and Trust Company, Hartford, Conn., as trustee Application December 22, 1948, Serial No. 66,735
In the Netherlands February 23, 1948

4 Claims. (Cl. 313—60)

The use of ball or roller bearings, of which the rolling parts and the races consist of hard metal and the rolling parts are covered with a thin layer of soft metal functioning as a lubricant entails difficulties in exhausted vessels. After a comparatively short time initially excellent bearings exhibit annoying noise and increasing frictional resistance. Due to the increase in frictional resistance the rotary part does not run at the required speed, more wear occurs and the life of the tube is reduced. Particularly X-ray tubes having a rotary anode suffer from these disadvantages and the invention has for its object to improve such tubes comprising ball or roller bearings of which the rolling parts are coated with a thin soft metal layer functioning as a lubricant.

As is known several metals acquire a greater hardness by cold swaging. In a ball or roller bearing a thin layer functioning as a lubricant, is subjected to a similar treatment, so that the hardness of this layer increases and the soft metal loses its lubricating properties with time. Soft and hard areas may be formed in the metal layer due to which the rotary movement becomes irregular and noise is caused.

The ball or roller bearings are heated when the tube is in use. If this heating occurs to a temperature in the proximity of the melting point of the soft metal, a layer which has become hard may regain its initial suitable properties and hardening may stay out. However, at this temperature considerable vaporisation of the soft metal may occur, so that the thickness of the layer decreases and it may become too thin with time.

These disadvantages are obviated by the invention. According thereto a quantity of soft metal functioning as a lubricant is enclosed in the tube. This metal is stored therein at an area where the temperature exceeds that to which the bearings supporting the rotary anode are heated. If, consequently, the temperature of the latter would become so high as to cause vaporisation of the soft metal, this would certainly be true of the metal stored. The metal vapour evolved may be guided to the ball bearings and deposits on them on cooling after putting the tube out of action or loading it to a lesser degree. The metal vapour should be prevented from finding its way to the part of the vacuum space where the electron discharge takes place. To this end the space containing the supporting means and the stock of soft metal may be separated from the discharge space through a duct in which the temperature remains lower.

The use of the invention is also advantageous if the supporting means are not heated to such a degree as to cause vaporisation of the lubricant. As a result of the constant vaporisation of the metal forming the stock a fresh deposit may constantly be formed on the layer covering the rolling parts. This fresh deposit has the initially favourable properties of the soft metal, so that the surface layer no longer hardens.

It is advisable to provide the soft metal in the proximity of the ball or roller bearing acquiring the maximum temperature from the supporting means for the rotary anode. In this area the vaporisation of the metal functioning as a lubricant is most rapid and, accordingly, the largest quantity of metal vapour will deposit.

The soft metal may be introduced into the space in several different ways. A container for the soft metal may be connected to a part of the anode attaining a sufficiently high temperature, which container should be constructed in such manner as to prevent molten metal from escaping, whereas the evolved metal vapour escapes. To this end use may be made of a tray covered with a piece of metal gauze. Alternatively, the metal may be incorporated in a skeleton or porous body consisting of a metal having a higher melting point, the apertures of the skeleton being so small that the molten metal is held by capillarity.

Instead of pure metal it is also possible to use a metal alloy of the soft metal and of another metal having a higher melting point.

In order that the invention may be more fully understood and readily carried into effect, it will now be described more fully with reference to the accompanying drawing, in which by way of example is shown a cross-section of an X-ray tube, according to the invention, having a rotary anode.

The wall 1 of the tube consists of glass and exhibits a re-entrant part 2 carrying the cathode system. The wall has another re-entrant part 4, of which the edge is sealed to the metal body 5, the latter containing the bearings 6 and 7 supporting the rotary shaft 8.

At the front end of the shaft 8 is secured a disc 9 which consists of tungsten and constitutes the rotary anode. This anode is clamped on the shaft 8 by means of a nut 10. For this purpose the shaft 8 is provided with a thickened portion 11. A member 12 comprising a cylindrical extension 13 which constitutes the rotor of an electric motor, in a manner known per se, is connected to the shaft 8 or forms part thereof. The electromagnetic stator (not represented) producing the magnetic rotary field actuating the anode is arranged around the tube at the same level.

Upon starting up the tube the front surface of the anode disc 9 is struck by electrons travelling at a high velocity from the cathode to the anode due to the potential difference set up between these electrodes. The X-rays issue from the tube through a thinner wall-portion 14. The heat evolved in the disc 9 is for the greater part radiated from the surface of the disc and partly dissipated through the shaft 8 to the body 12 and through the bearings 6 and 7 to the part 5 which is adapted to be cooled during operation.

To ensure constant satisfactory operation of the ball bearings the balls and the races are provided with a thin layer of a suitable soft metal. The coating has for its object to prevent the balls from scoring the metal of the races. With time, however, the excellent properties of this coating might disappear. The rolling movement of the balls over the races causes constant variation of the pressure locally exerted on the metal layer, due to which the latter hardens. For this reason the coating should consist of a material which softens due to the heat evolved. This heat, however, involves vaporisation of the metal functioning as a lubricant, so that it disappears from the bearings and deposits at other points after a comparatively short time.

According to the invention the space containing the ball bearings contains a stock of a soft metal which functions as a lubricant and is more particularly provided where it is heated to such a degree as to evaporate gradually due to the heat produced in the tube. To this end a container 15 containing a quantity of the soft metal is clamped to the shaft. This container is preferably arranged in the proximity of the ball bearing 7 which, during operation, is heated to a temperature exceeding that of the bearing 6.

Among the materials of which the coating of a ball or roller bearing may consist may, for instance, be mentioned metals such as lead, tin, cadmium and zinc, of which the melting points substantially correspond to the temperature to which the ball bearing 7 is heated. During normal operation of the X-ray tube the temperature of the inner race of the ball bearing seated on the shaft of the rotary anode will rise to 350 to 400° C. At this temperature a lead coating which tends to harden constantly, due to the movement of the rolling parts, softens but at the same time vaporisation of the lead occurs. The layer is prevented from becoming thinner by constant vaporisation of a quantity of the soft metal in stock, of which, upon cooling, part of the vapour deposits on the rolling parts of the bearing. This vaporisation may at the same time form a deposit on rolling parts, of which the surface layer functioning as a lubricant does not appreciably vaporise, so that the constant formation of a fresh deposit on this surface prevents hardening of the surface layer. The tube should contain a quantity of metal such that the time occupied for complete vaporisation exceeds the desired life of the tube or is at least equal thereto.

Part of the heat supplied through the shaft 8 is dissipated through the body 12 to the cylindrical extension 13. This part of the heat is radiated by the surface of the extension. Consequently, the hottest area in the space containing the ball bearings is at the side of the body 12 which is considered in arranging the container 15. This location communicates through the narrow space between the extension 13 and the cooled part 15 with the discharge space of the tube. In this communication the temperature at the end of the extension 13 is lower than at the other end connected to the body 12, so that the vapour of the soft metal condenses in this communication and deposits on the wall of the part 5 to be cooled, so that the vapour does not find its way into the discharge space.

In comparison with the conventional constructions, the invention affords greater independency of the temperature of the ball bearings, since loss of lubricant due to vaporisation is compensated by the deposit of metal vapour from the stock of metal on to the rolling parts. In this manner constant renewal of the surface layer of soft metal on the rolling parts of the ball bearings occurs, whereby hardening of this layer is avoided at the same time.

The stock of soft metal may also be provided in a manner different from that used in the embodiment of the invention as represented, for example by using a porous or skeleton part of a metal having a higher melting point, in which the soft metal is incorporated and which may be located at the point reserved for the container.

What I claim is:

1. An X-ray tube comprising an evacuated envelope, a cathode, a rotatable anode, an anode supporting member secured to the anode and rotatable therewith and having a hollow cylindrical extension, a hollow stationary anode supporting member secured to the envelope positioned within the cylindrical extension and forming therewith a communicating passage between the discharge space and the interior of the stationary supporting member, a shaft member connected to the anode supporting member and extending axially through the stationary supporting member, bearing means interposed between the shaft and the stationary supporting member, and means to store a supply of a bearing lubricant spaced apart and separate from the bearing means and positioned between the bearing means and the anode supporting member, said bearing lubricant storage means being arranged to be heated to a temperature greater than that of the bearing means during normal operation of the tube.

2. An X-ray tube comprising an evacuated envelope, a cathode, a rotatable anode, an anode supporting member secured to the anode and rotatable therewith and having a hollow cylindrical extension, a hollow stationary anode supporting member secured to the envelope within the cylindrical extension and forming therewith a communicating passage between the discharge space and the interior of the stationary supporting member, a shaft member connected to the anode supporting member and extending axially through the stationary supporting member, bearing means interposed between the shaft and the stationary supporting member, and means to store a supply of a bearing lubricant spaced apart and separate from the bearing means and in heat transfer relationship with said rotatable anode supporting member whereby said lubricant is heated to a temperature greater than that of the bearing means during normal operation of the tube.

3. An X-ray tube comprising an evacuated envelope, a cathode, a rotatable anode, an anode supporting member secured to the anode and rotatable therewith and having a hollow cylindrical extension, a hollow stationary anode supporting member secured to the envelope within the cylindrical extension and forming therewith a communicating passage between the discharge space and the interior of the stationary supporting member, a shaft member connected to the anode supporting member and extending axially through the stationary supporting member, bearing means interposed between the shaft and the stationary supporting member, and a cup-shaped container in heat-transfer relationship with the rotatable anode supporting member for retaining a supply of a metal bearing lubricant spaced apart and separate from the bearing means at a temperature greater than that of the bearing means during normal operation of the tube.

4. An X-ray tube comprising an evacuated envelope, a cathode, a rotatable anode, an anode supporting member secured to the anode and rotatable therewith and having a hollow cylindrical extension, a hollow stationary anode supporting member secured to the envelope within the cylindrical extension and forming therewith a communicating passage between the discharge space and the interior of the stationary supporting member, a shaft member connected to the anode supporting member and extending axially through the stationary supporting member, bearing means interposed between the shaft and the stationary supporting member, and a container in heat-transfer relationship with the rotatable anode supporting member for retaining a porous metal body impregnated with a soft metal bearing lubricant spaced apart and separate from the bearing means, said bearing lubricant storage means being arranged to be at a temperature greater than that of the bearing means during normal operation of the tube.

BART COMBÉE.

REFERENCES CITED

The following references are of record in the file of this patent:

UNITED STATES PATENTS

| Number | Name | Date |
|---|---|---|
| 2,280,886 | Brace | Apr. 28, 1942 |